US012053133B2

(12) United States Patent
Huang et al.

(10) Patent No.: US 12,053,133 B2
(45) Date of Patent: Aug. 6, 2024

(54) DOCKING STATION AND CLEANING ROBOT SYSTEM

(71) Applicant: SHENZHEN FLY RODENT DYNAMICS INTELLIGENT TECHNOLOGY CO., LTD., Shenzhen (CN)

(72) Inventors: Jinguang Huang, Shenzhen (CN); Li Lei, Shenzhen (CN)

(73) Assignee: SHENZHEN FLY RODENT DYNAMICS INTELLIGENT TECHNOLOGY CO., LTD., Shenzhen (CN)

( * ) Notice: Subject to any disclaimer, the term of this patent is extended or adjusted under 35 U.S.C. 154(b) by 418 days.

(21) Appl. No.: 17/457,357

(22) Filed: Dec. 2, 2021

(65) Prior Publication Data

US 2022/0287536 A1 Sep. 15, 2022

(30) Foreign Application Priority Data

Mar. 10, 2021 (CN) ......................... 202110260159.7

(51) Int. Cl.

| | |
|---|---|
| ***A47L 11/40*** | (2006.01) |
| ***A47L 11/28*** | (2006.01) |
| ***B08B 1/16*** | (2024.01) |
| ***B08B 1/30*** | (2024.01) |
| ***B08B 1/50*** | (2024.01) |
| ***B08B 3/02*** | (2006.01) |

(52) U.S. Cl.
CPC ........... *A47L 11/4091* (2013.01); *A47L 11/28* (2013.01); *B08B 1/165* (2024.01); *B08B 1/30* (2024.01); *B08B 1/50* (2024.01); *B08B 3/02* (2013.01); *A47L 2201/028* (2013.01); *B08B 2203/027* (2013.01)

(58) Field of Classification Search
CPC ......................... B08B 1/165; A47L 23/26–266
USPC ........................................................ 15/30–37
See application file for complete search history.

(56) References Cited

U.S. PATENT DOCUMENTS

| | | | | |
|---|---|---|---|---|
| 3,802,021 A * | 4/1974 | Schulz | A47L 23/263 15/36 |
| 2008/0104782 A1* | 5/2008 | Hughes | A47L 23/05 15/112 |
| 2019/0159646 A1* | 5/2019 | Luyckx | A47L 11/4016 |
| 2019/0202064 A1* | 7/2019 | Wolff | H02J 7/0042 |

* cited by examiner

*Primary Examiner* — Andrew A Horton
(74) *Attorney, Agent, or Firm* — Samson G. Yu

(57) ABSTRACT

A docking station includes a base and a cleaning member assembly. The cleaning member assembly includes at least one cleaning member, a first bracket, a second bracket, and a power source. Each of the at least one cleaning member is mounted on the first bracket and the second bracket. One of the first bracket and the second bracket is a fixed bracket, and the other is a movable bracket. The movable bracket is driven to reciprocate along a straight line, in order to drive each the cleaning member to swing relative to the first bracket around a central axis.

18 Claims, 4 Drawing Sheets

DOCKING STATION AND CLEANING ROBOT SYSTEM

CROSS-REFERENCE TO RELATED APPLICATIONS

This application is based upon and claims priority to Chinese Patent Application CN 202110260159.7, filed Mar. 10, 2021, the entire contents of which are incorporated herein by reference.

TECHNICAL FIELD

The present disclosure relates to the field of cleaning robots, and more particular to a docking station and a cleaning robot system.

BACKGROUND

A cleaning robot is a special robot for serving humans, which is mainly engaged in household cleaning. One type of cleaning robot, such as a mopping robot, which is equipped with a mopping cloth for cleaning the ground. After finishing the cleaning, the mopping cloth of the cleaning robot needs to be cleaned on the docking station.

Generally, the cleaning robot needs to reciprocate on the docking station to cooperate with the roller brush of the docking station, so as to clean the mopping cloth.

However, the cleaning robot is easy to slide out of the docking station during the reciprocating movement.

SUMMARY

There are provided a docking station and a cleaning robot system according to embodiments of the present disclosure. The technical solution is as below:

According to a first aspect of embodiments of the present disclosure, there is provided a docking station, comprising:

a base; and a cleaning member assembly comprising:

a first bracket;

a second bracket, wherein one of the first bracket and the second bracket is a fixed bracket, and the other is a movable bracket, wherein the fixed bracket is fixed to the base; and at least one cleaning member, wherein each the cleaning member is mounted on the first bracket and the second bracket, wherein the movable bracket is driven to reciprocate along a straight line, in order to drive each the cleaning member to swing relative to the first bracket around a central axis.

According to a second aspect of embodiments of the present disclosure, there is provided a cleaning robot system, comprising:

a docking station comprising:

a base; and a cleaning member assembly comprising:

- a first bracket;
- a second bracket, wherein one of the first bracket and the second bracket is a fixed bracket, and the other is a movable bracket, wherein the fixed bracket is fixed to the base; and at least one cleaning member, wherein each the cleaning member is mounted on the first bracket and the second bracket, wherein the movable bracket is driven to reciprocate along a straight line, in order to drive each the cleaning member to swing relative to the first bracket around a central axis; and a cleaning robot configured to be docked at the docking station, and wherein a cleaning member assembly is configured to scrape the cleaning robot.

BRIEF DESCRIPTION OF THE DRAWINGS

One or more embodiments are exemplified by the corresponding figures in the accompanying drawings. These exemplified descriptions do not constitute a limitation on the embodiments. The elements with the same reference numerals in the drawings are denoted as similar elements. Unless otherwise stated, the figures in the accompanying drawings do not constitute a scale limitation.

DETAILED DESCRIPTION

In order to facilitate understanding of the present disclosure, the present disclosure will be described in more detail below with reference to the accompanying drawings and specific embodiments. It should be noted that when an element is expressed as "connected to" another element, it may be directly on the other element or there may be one or more intermediate elements provided therebetween. The terms "up", "down", "left", "right", "upper end", "lower end", "top" and "bottom" used in this specification indicate orientation or positional relationships based on the drawings, which are merely for conveniently describing the present disclosure and simplifying the description, rather than indicating or implying that the indicated device or element must have a specific orientation, be constructed and operated in a specific orientation, and thus they cannot be understood as a limitation of the present disclosure. Moreover, the terms "first", "second" and the like are used for descriptive purposes only and cannot be understood to indicate or imply relative importance.

Unless defined otherwise, all technical and scientific terms used in this description are the same as those commonly understood by those skilled in the art belonging to the present disclosure. The terms used in the description of the present disclosure are used for the purpose of describing particular embodiments only and are not intended to limit the present disclosure.

Figure 1:
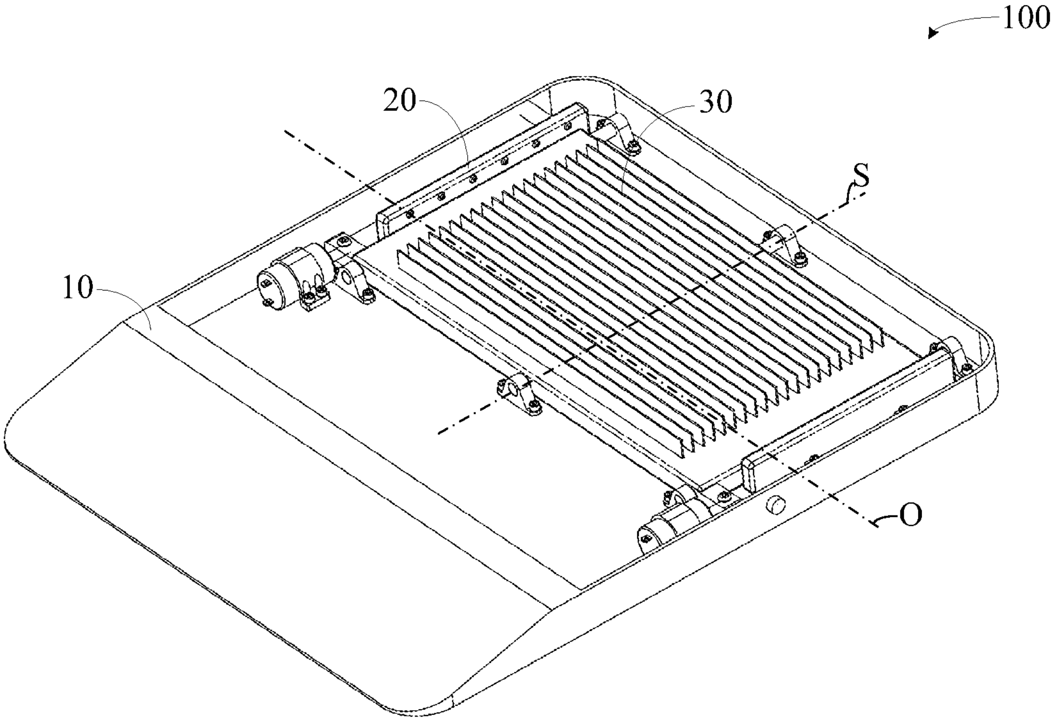
FIG. 1 is a view of a docking station according to an embodiment of the present disclosure.
Figure 2:
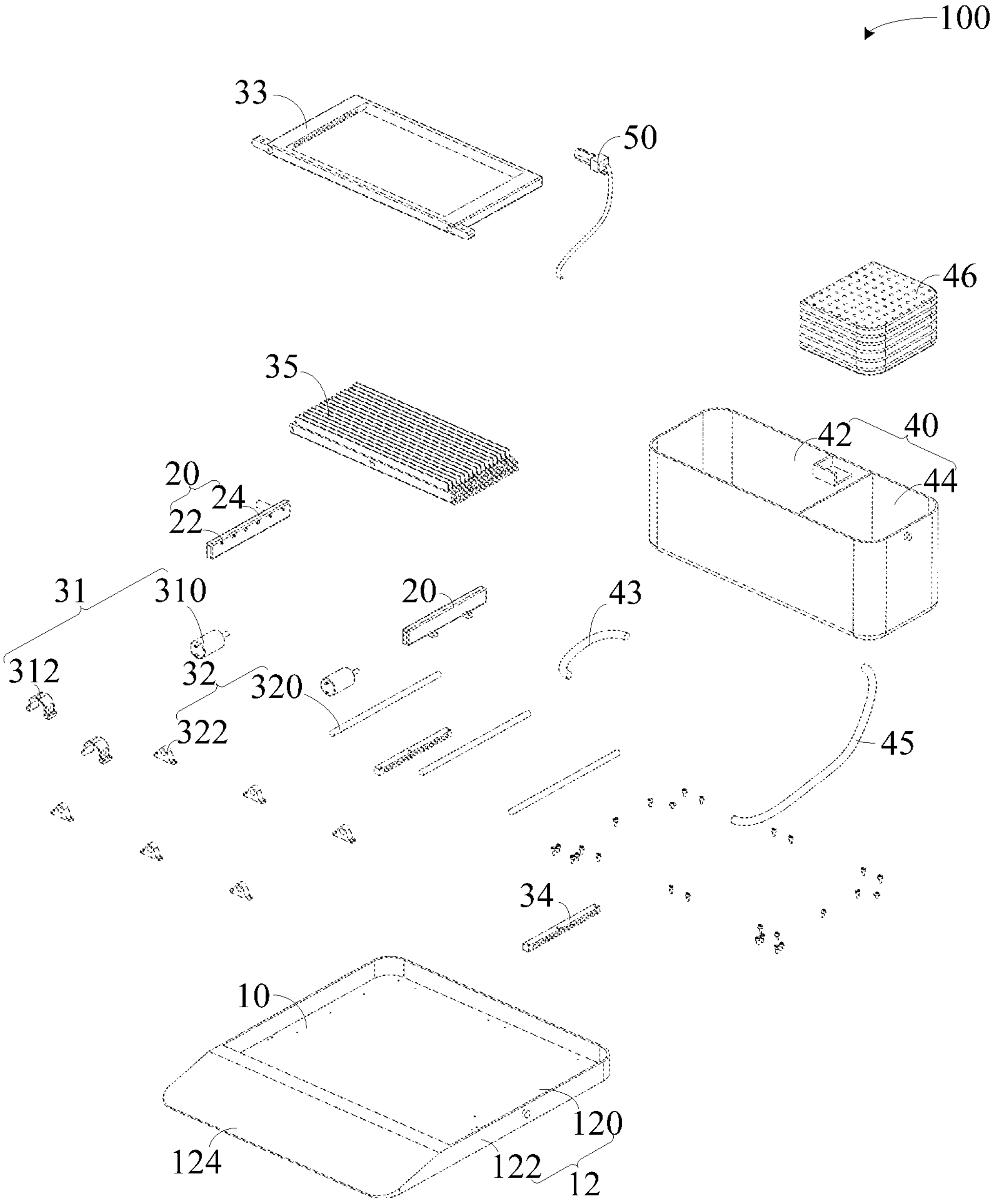
FIG. 2 is an exploded view of the docking station shown in FIG. 1.
Figure 3:
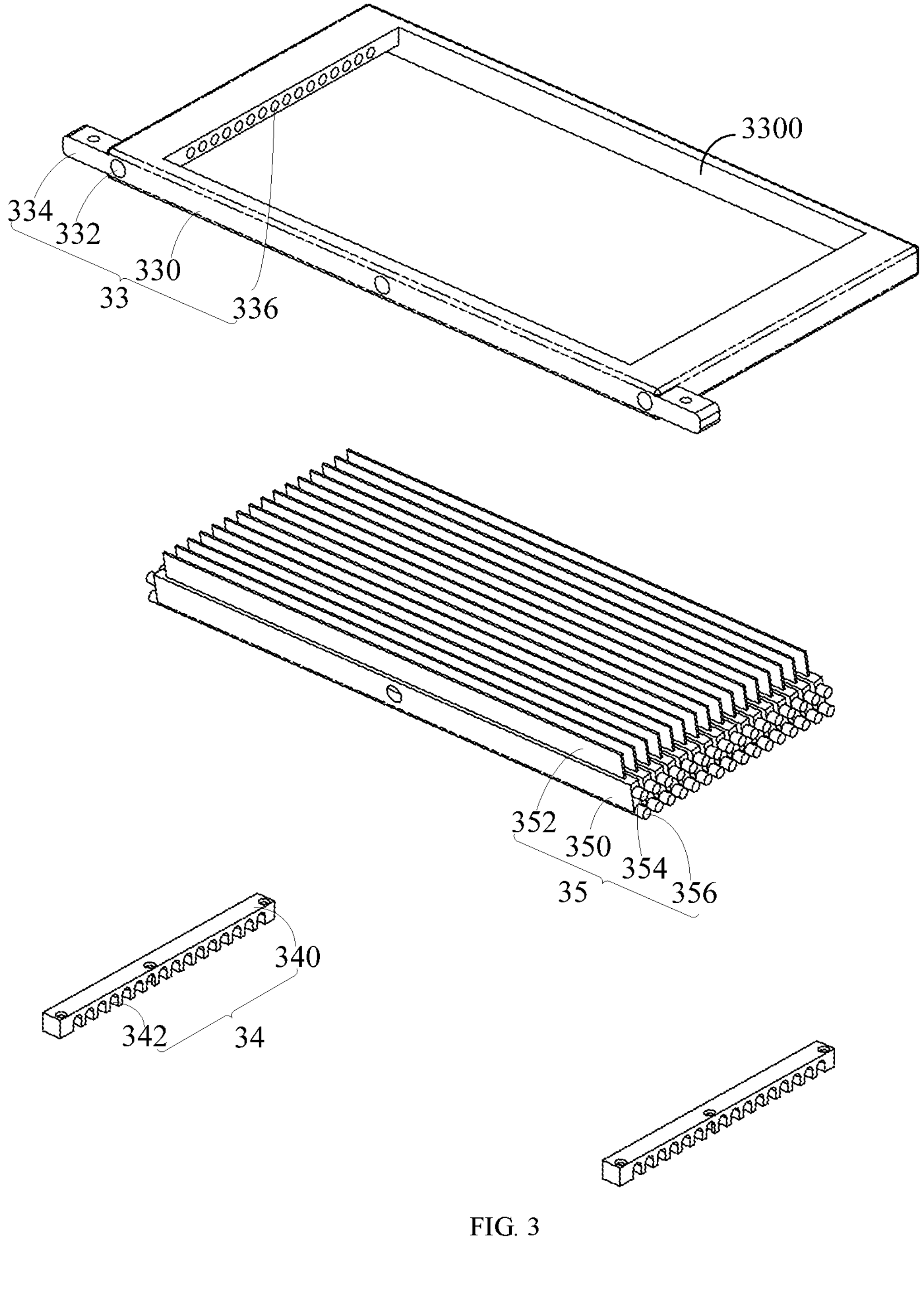
FIG. 3 is a view of a first bracket, a second bracket and a cleaning member of the docking station shown in FIG. 2.

Referring to FIGS. 1, 2 and 3, an embodiment of the present disclosure provides a docking station 100 including a base 10, a cleaning assembly 20 and a cleaning member assembly 30. The cleaning assembly 20 and the cleaning member assembly 30 are mounted on the base 10. The base 10 is configured to dock the cleaning robot. After the cleaning robot is docked on the base 10, the cleaning member assembly 30 can scrape the portions to be cleaned of the cleaning robot. The portions to be cleaned may be a mopping cloth, and in practice, may be any portion on the cleaning robot. The cleaning assembly 20 is configured to discharge the cleaning liquid to the cleaning member assembly 30 and/or the portions to be cleaned of the cleaning robot docked on the base 10, thereby improving the cleaning efficiency.

It should be noted that, since the cleaning member assembly 30 directly scrapes the portions to be cleaned of the cleaning robot, the cleaning liquid may be discharged only on the portions to be cleaned of the cleaning robot, or may be discharged only on the cleaning member assembly 30, or may be discharged simultaneously on the portions to be cleaned of the cleaning robot and the cleaning member assembly 30.

It can be understood that, the cleaning assembly 20 may be omitted according to practical needs, for example, when the cleaning robot can be cleaned only by scraping by the cleaning member assembly 30.

The base 10 includes a docking plate (not shown) and a waste liquid tank 12.

The docking plate is configured to dock the cleaning robot. The waste liquid tank 12 is provided below the docking plate. The cleaning member assembly 30 and the cleaning assembly 20 are accommodated in the waste liquid tank 12. An opening is opened on the docking plate to expose the cleaning member assembly 30, so that the cleaning member assembly 30 can scrape the portions to be cleaned docked on the docking plate. The waste liquid tank 12 can collect the waste liquid after the cleaning robot is cleaned with the cleaning liquid, so as to avoid contamination of the waste liquid.

The waste liquid tank 12 includes a bottom wall 120 and a side wall 122. The side wall 122 extends from the periphery of the bottom wall 120 towards the upper side of the bottom wall 120. The docking plate is opposite to the bottom wall 120, and is connected to the side wall 122.

The base 10 includes an inclined surface 124. The inclined surface 124 extends obliquely from an edge of the docking plate to the bottom of the docking plate, and the cleaning robot may reach or exit the docking plate through the inclined surface 124.

It can be understood that, the inclined surface 124 may also be arranged on a structure other than the waste liquid tank 12 according to practical needs, which is not limited in the present application.

The cleaning assembly 20 includes a nozzle holder 22 and at least one nozzle 24. Each of the at least one nozzle 24 is fixed to the bottom wall 120 by the nozzle holder 22. The nozzle holder 22 may be fixed to the bottom wall 120 by screws, or may be welded to the bottom wall 120.

When the cleaning assembly 20 includes at least two nozzles 24, the at least two nozzles 24 are arranged along a straight line S. The straight line S may be parallel to the bottom wall 120.

The at least one nozzle 24 faces the cleaning assembly 20 and/or the cleaning robot docking on the base 10, and is configured to discharge the cleaning liquid to the cleaning assembly 20 and/or the cleaning robot docking on the base 10.

The number of the cleaning assemblies 20 is two. The two cleaning assemblies 20 are respectively arranged on two opposite sides of the cleaning member assembly 30, thereby improving the cleaning efficiency.

The docking station 100 further includes a container 40 and a washing liquid pump 50. The container 40 includes a washing liquid storage 42. The cleaning liquid storage 42 is communicated with the cleaning liquid pump 50 and the cleaning assembly 20. The cleaning liquid storage 42 is configured to store the cleaning liquid, and the cleaning liquid pump 50 is configured to transport and provide the cleaning liquid stored in the cleaning liquid storage 42 to the cleaning assembly 20.

The cleaning liquid storage 42 is communicated with the cleaning assembly 20 through a cleaning liquid conveying pipe 43. It can be understood that the cleaning liquid conveying pipe 43 may be omitted according to practical needs, for example, the cleaning liquid storage 42 is arranged adjacent to the cleaning assembly 20, so that the cleaning liquid storage 42 can be directly communicated with the cleaning assembly 20.

The container 40 further includes a waste liquid storage 44.

The docking station 100 also includes a waste liquid pump (not shown).

The waste liquid storage 44 is communicated with the waste liquid tank 12 and the waste liquid pump. The waste liquid pump is configured to pump the waste liquid in the waste liquid tank 12 to the waste liquid storage 44.

The waste liquid storage 44 is communicated with the waste liquid tank 12 through a waste liquid conveying pipe 45. It can be understood that the waste liquid conveying pipe 45 may be omitted according to practical needs, for example, the waste liquid storage 44 is arranged adjacent to the waste liquid tank 12, so that the waste liquid storage 44 can be directly communicated with the waste liquid tank 12.

The bottom of the waste liquid storage 44 is communicated with the bottom of the cleaning liquid storage 42, and the top of the waste liquid storage 44 is communicated with the waste liquid tank 12. A filter 46 is arranged between the top and bottom of the waste liquid storage 44. When the waste liquid enters the waste liquid storage 44 from the waste liquid tank 12, it arrives at the filter 46 by gravity, and the filter 46 is configured to separate the cleaning liquid and the dirt in the waste liquid. The separated cleaning liquid passes through the filter 46 and enters the bottom of the waste liquid storage 44. Since the bottom of the waste liquid storage 44 is communicated with the bottom of the cleaning liquid storage 42, the cleaning liquid can enter the cleaning liquid storage 42 to recycle, and the separated dirt stays on the filter 46. The filter 46 may then be removed from the waste liquid storage 44 to be removed dirt.

The filter 46 includes a plurality of filter plates with holes. Each of the filter plates is arranged horizontally, and the plurality of filter plates are arranged vertically.

The cleaning member assembly 30 includes a power source 31, a guide rail 32, a first bracket 33 and a second bracket 34, and at least one cleaning member 35.

The guide rail 32 is fixed to the base 10. The first bracket 33 is mounted on the guide rail 32, and the second bracket 34 is fixed to the base 10. Each of the cleaning members 35 is mounted on the first bracket 33 and the second bracket 34. The power source 31 is mounted on the base 10 and connected to the first bracket 33. The power source 31 is configured to drive the first bracket 33 to reciprocate along the straight line S, so as to drive each of the cleaning members 35 to swing around a central axis O through the first bracket 33, so that the cleaning member assembly 30 can scrape the cleaning robot. The central axis O around which each of the cleaning members 35 swings is perpendicular to the straight line S.

The central axis O may be parallel to the bottom wall 120.

The power source 31 includes a linear motor 310 and a motor fixing seat 312. The linear motor 310 is fixed to the bottom wall 120 through the motor fixing seat 312.

The motor fixing seat 312 is fixed to the bottom wall 120 by screws, and may be fixed to the bottom wall 120 by welding according to practical needs.

The output end of the linear motor 310 is connected to the first bracket 33 for driving the first bracket 33 to reciprocate along the straight line S.

The number of the linear motor 310 is two. The output ends of the two linear motors 310 are respectively connected to the two ends of the first bracket 33, which can drive the first bracket 33 to move along the straight line S relatively smoothly.

It can be understood that, the number of the linear motors 310 may also be only one according to practical needs. For example, the output end of the linear motor 310 is connected to a portion between the two ends of the first bracket 33.

It can be understood that, the motor fixing seat 312 can be omitted according to practical needs. For example, the linear motor 310 is directly fixed to the bottom wall 120.

It can be understood that, the linear motor 310 can also be replaced with a driving device such as a cylinder or a rotating motor according to practical needs. When the linear motor 310 is replaced with a rotating motor, the rotating motor needs to be connected to the first bracket 33 through a transmission mechanism such as a worm gear, a screw or the like.

The guide rail 32 includes guide rods 320 and a guide rod fixing seat 322.

The length direction of each of the guide rods 320 is parallel to the straight line S.

Both ends of each of the guide rods 320 are fixed to the bottom wall 120 by the guide rod fixing seat 322, and the guide rod fixing seat 322 is fixed to the bottom wall 120 by screws, or may be welded to the bottom wall 120 according to practical needs.

It can be understood that, the guide rod fixing seat 322 may be omitted according to practical needs. For example, two ends of each of the guide rods 320 are respectively fixed to two opposite positions of the side wall 122.

The guide rods 320 are sleeved in the first bracket 33, which can guide the first bracket 33 to move along a length direction of the guide rods 320.

The number of the guide rods 320 is three. Among the three guide rods 320, two guide rods 320 are respectively sleeved on both ends of the first bracket 33, and the remaining one of the guide rods 320 is sleeved between the two ends of the first bracket 33. The three guide rods 320 can guide the first bracket 33 to move along the straight line S relatively smoothly.

It can be understood that, the guide rail 32 can be omitted according to practical needs. For example, the driving source 31 can output a relatively large thrust or pulling force, so that the first bracket 33 can reciprocate along the straight line S without being guided by the guide rail 32.

The first bracket 33 includes a first main body portion 330, guide hole portions 332, connecting portions 334 and at least one first swinging portion 336 provided on the first main body portion 330.

A through groove 3300 is provided on the first main body portion 330. The through groove 3300 is configured to accommodate the at least one cleaning member 35.

The guide hole portions 332 are configured to sleeve the guide rods 320. The number of the guide hole portions 332 is three. Among the three guide hole portions 332, two guide hole portions 332 are respectively provided throughout both ends of the first main body portion 330, and the remaining one guide hole portion 332 is provided throughout a portion between the two ends of the first main body portion 330. Each of the guide hole portions 332 is configured to sleeve one of the guide rods 320.

The connecting portions 334 are configured to connect the output end of the linear motor 310. The number of the connecting portions 334 is two. The two connecting portions 334 are respectively arranged on two opposite sides of the first main body portion 330, and each of the two connecting portions 334 is configured to connect an output end of the linear motor 310.

It can be understood that, the connecting portion 334 may be omitted according to practical needs. For example, the output end of the linear motor 310 may be directly connected to the first main body portion 330.

Each of the first swinging portions 336 is configured to assemble one cleaning member 35.

The first bracket 33 includes at least two first swinging portions 336, and the two first swinging portions 336 are opposite to each other and are respectively arranged on two opposite groove walls of the through groove 3300.

Each of the two first swinging portions 336 arranged opposite to each other is configured to assemble one cleaning member 35.

Each of the first swinging portions 336 includes a shaft hole structure. A center line of the shaft hole structure is coincided with the center axis O.

The second bracket 34 includes a second main body portion 340 and at least one first sliding portion 342 arranged on the second main body portion 340.

The second main body portion 340 is substantially in a strip shape, and its length direction is parallel to the straight line S. The second main body 340 is fixed to the bottom wall 120 by screws, or may be welded to the bottom wall 120 according to practical needs.

Each of the at least one first sliding portions 342 is configured to assemble one cleaning member 35.

Each of the at least one first sliding portions 342 includes a sliding groove structure. The length direction of the sliding groove structure is perpendicular to the bottom wall 120, one end of the sliding groove structure is close to the bottom wall 120, and the other end is away from the bottom wall.

It can be understood that, the included angle between the length direction of the sliding groove structure and the bottom wall 120 may also be other angles according to practical needs, as long as the sliding groove structure is not parallel to the bottom wall 120. The included angle between the length direction of the sliding groove structure and the bottom wall is 60 degrees to 90 degrees, in order to ensure the stability of the swing of each of the cleaning members 35.

The number of the second brackets 34 is two. The positions of the two second brackets 34 are opposite to each other.

Each of the cleaning members 35 includes a base portion 350, a scraping portion 352, a second swinging portion 354 and a second sliding portion 356. The scraping portion 352 and the second swinging portion 354 are both connected to one end of the base portion 350, and the second sliding portion 356 is connected to the other end of the base portion 350.

The base portion 350 of each of the cleaning members 35 is arranged in the through groove 3300.

The scraping portion 352 of each of the cleaning members 35 is configured to scrape the cleaning robot when the cleaning member 35 swings.

The second swinging portion 354 of each of the cleaning members 35 is configured to assemble one of the first swinging portions 336.

Each of the cleaning members 35 includes two second swinging portions 354. The two second swinging portions 354 of each of the cleaning members are respectively arranged on two opposite sides of the base portion 350 of the cleaning member 35. Every two first swinging portions 336 arranged opposite to each other are respectively configured to be assembled to two second swinging portions 354 of the cleaning member.

The second swinging portion 354 includes a rotating shaft structure. A center line of the rotating shaft structure is coincided with the center axis O around which the cleaning member 35 swings. The rotating shaft structure of each of the cleaning members 35 is configured to insert a shaft hole structure of the first swinging portion 336, and the rotating shaft structure can swing in the shaft hole structure, so that the cleaning member 35 can swing relative to the first bracket 33.

The second sliding portion 356 of each of the cleaning member 35 is configured to assemble one of the first sliding portions 342.

Each of the cleaning members 35 includes two of the second sliding portions 356. The two second sliding portions 356 of each of the cleaning members 35 are respectively arranged on two opposite sides of the base portion 350 of the cleaning member 35. The two second sliding portions 356 of each of the cleaning members 35 are configured to respectively assemble two first sliding portions 342 of the two second brackets 34.

The second sliding portion 356 includes a sliding shaft structure. The center line of the sliding shaft structure of each of the cleaning members 35 is parallel to the central axis O around which the cleaning member 35 swings.

The sliding shaft structure of each cleaning member 35 is configured to insert into the sliding groove structure of the first sliding portion 342, and the sliding shaft structure can reciprocate along the length direction of the sliding groove structure, to restrain cleaning member 35 when the first bracket 33 moves, so that the cleaning member 35 swings relative to the first bracket 33.

Figure 4:
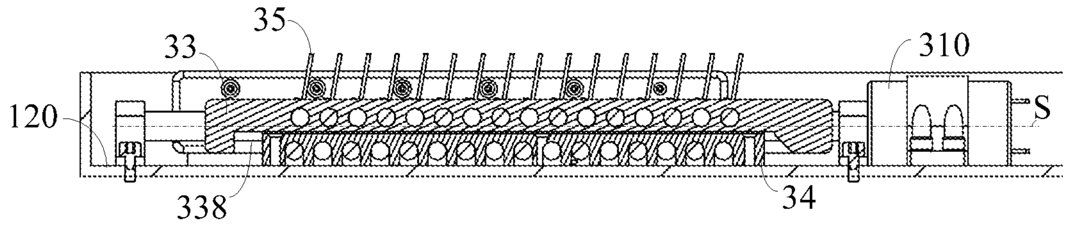
FIGS. 4 to 6 are views of the docking station shown in FIG. 1 in three different states.
Figure 5:
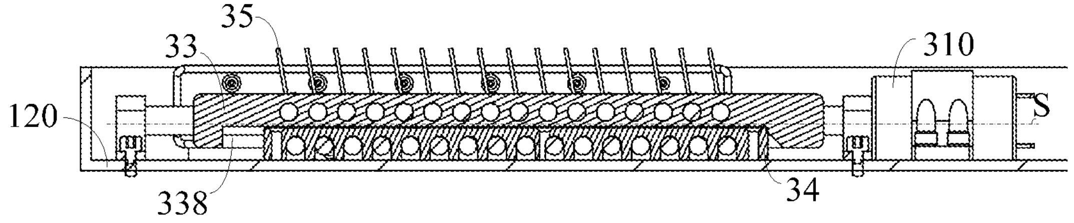
Figure 6:
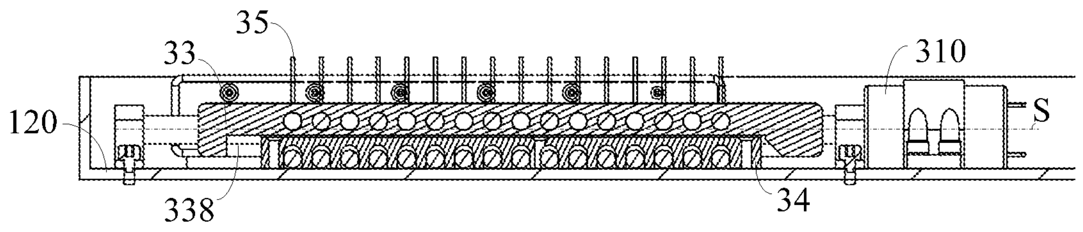

Referring to FIGS. 4 to 6, after the linear motor 310 is started, the first bracket 33 is driven to move reciprocally along the straight line S relative to the second bracket 34. In each of the cleaning members 35, the rotating shaft structure swings in the shaft hole structure, and the sliding shaft structure reciprocates along the sliding groove structure at the same time, to make the cleaning members 35 swing relative to the first bracket 33, so that the scraping portion 352 swings to scrape the cleaning robot.

When the first bracket 33 moves to an extreme position along the straight line S, each of the cleaning members 35 swings to an extreme angle, and the sliding shaft structure of each of the cleaning members 35 slides to a top end of the sliding groove structure along the sliding groove structure (as shown in FIG. 4). When the first bracket 33 moves to another extreme position, each of the cleaning members 35 swings to another extreme angle, and the sliding shaft structure of each of the cleaning member 35 slides to the top end of the sliding groove structure along the sliding groove structure (as shown in FIG. 5). When the first bracket 33 moves to a middle position between the two extreme positions, each of the cleaning members swings to an intermediate angle between the two extreme angles, and are perpendicular to the bottom wall 120. The sliding shaft structure of the cleaning member 35 slides to the bottom of the sliding groove structure along the sliding groove structure (as shown in FIG. 6).

It can be understood that, the first bracket 33 may also be fixed to the base 10 according to practical needs. The power source 31 is connected to the second bracket 34 for driving the second bracket 34 to move along the straight line S, and the second bracket 34 can also drive each of the cleaning members 35 to swing relative to the first bracket 33 around the central axis O. Therefore, the first bracket 33 and the second bracket 34 are required to satisfy the following conditions.

One of the first bracket 33 and the second bracket 34 is a fixed bracket, and the other is a movable bracket. The fixed bracket is fixed to the base 10, and the power source 31 is connected to the movable bracket, so as to drive the movable bracket to move relative to the base 10 along the straight line S.

It can be understood that, the rotating shaft structure can be interchanged with the shaft hole structure, that is, the first swinging portion 336 includes a rotating shaft structure, and the second swing portion 354 includes a shaft hole structure.

It can be understood that, the sliding shaft structure can be interchanged with the sliding groove structure according to practical needs, that is, the first sliding portion 342 includes a sliding shaft structure, and the second sliding portion 356 includes a sliding groove structure. The length direction of the sliding groove structure is parallel to the length direction of the base portion 350.

It can be understood that, the first bracket 33 may also be arranged between the second bracket 34 and the bottom wall 120 according to practical needs. Accordingly, in each of the cleaning members 35, the scraping portion 352 and the second sliding portion 356 are arranged at an end of the base portion 350, and the second swinging portion 354 is arranged at the other end of the base portion 350.

In some embodiments, the second bracket 34 is arranged between the first bracket 33 and the bottom wall 120, which can save space in the horizontal direction.

In some embodiments, an accommodating groove 338 is formed on the lower surface of the first bracket 33, and the accommodating groove 338 can accommodate the second bracket 34, which can save space in the vertical direction.

When the cleaning robot needs to be cleaned, the cleaning robot is docked at a preset position on the base 10. The cleaning robot can reach the preset position of the base 10 through methods such as infrared sensing, radar detection, map building.

When the cleaning robot is docked at the preset position on the base 10, the portions to be cleaned of which is facing the cleaning member assembly 30, the docking station 100, supplies forward-reverse cycle power to the linear motor 310 after activating the linear motor 310, so that the linear motor 310 drives the first bracket 33 to reciprocate along the straight line. With the cooperation of the second bracket 34, the first bracket 33 drives each of the cleaning member 35 swings around the central axis O, so that the scraping portion 352 of the at least one cleaning member 35 cleans the portions to be cleaned of the cleaning robot. At the same time, the cleaning member assembly 30 can discharge the cleaning liquid to the scraping portion 352 of the at least one cleaning member 35 and/or the portions to be cleaned of the cleaning robot.

Another embodiment of the present disclosure provides a cleaning robot system. The cleaning robot includes a cleaning robot and the docking station 100 described in the foregoing embodiments.

The cleaning robot can be docked at the docking station 100. The cleaning robot includes a mopping cloth.

The cleaning member assembly 30 is configured to scrape the mopping cloth of the cleaning robot.

Compared to the traditional technology, in the docking station 100 and the cleaning robot system provided by the embodiments of the present disclosure, the cleaning members 35 of swinging can scrape and clean the portions to be cleaned of the cleaning robot, and the cleaning robot does not need to reciprocate on the docking station 100, thereby avoiding the problem that the cleaning robot is easy to slide out of the docking station 100 when the cleaning robot reciprocates on the docking station 100 to clean its mopping cloth.

Finally, it should be noted that the above embodiments are only used to illustrate the technical solutions of the present disclosure, which are not provided to limit the present disclosure. Under the idea of the present disclosure, the technical features of the above embodiments or different embodiments can also be combined, and the steps can be implemented in any order. There are many other variations of the different aspects of the present disclosure as described above. For the sake of brevity, they are not provided in details. Although the present disclosure has been described in detail with reference to the foregoing embodiments, those of ordinary skill in the art should understand that: they can still modify the technical solutions recorded in the foregoing embodiments, or equivalently replace some of the technical features. These modifications or replacements do not cause the essence of the corresponding technical solutions to deviate from the scope of the technical solutions of the embodiments of the present disclosure.

What is claimed is:

1. A docking station, comprising:

a base; and a cleaning member assembly comprising:

a first bracket;

a second bracket, wherein one of the first bracket and the second bracket is a fixed bracket relative to the base, and the other is a movable bracket relative to the base, wherein the fixed bracket is fixed to the base; and at least one cleaning member, wherein each cleaning member is mounted on the first bracket and the second bracket, wherein the movable bracket is driven to reciprocate along a straight line, in order to drive each cleaning member to swing relative to the first bracket around a central axis;

wherein the first bracket comprises:

a first main body portion; and at least one first swinging portion arranged on the first main body portion;

wherein the second bracket comprises:

a second main body portion; and at least one first sliding portion arranged on the second main body portion;

wherein each cleaning member comprises:

a base portion;

a second swinging portion connected to one of the at least one first swinging portion; and a second sliding portion connected to one of the at least one first sliding portion, and wherein the second swinging portion and the second sliding portion are respectively arranged at two ends of the base portion, when the movable bracket is driven to reciprocate along a straight line, the second swinging portion of each cleaning member swings relative to the first swinging portion around the central axis, and each second sliding portion slides relative to the first sliding portion.

2. The docking station of claim 1, wherein each cleaning member further comprises a scraping portion configured to scrape a cleaning robot when the cleaning member swings, and wherein the scraping portion and the second swinging portion are arranged at an end of the base portion, and the second sliding portion is arranged at the other end of the base portion.

3. The docking station according to claim 2, wherein the base comprises a bottom wall, and the second bracket is arranged between the first bracket and the bottom wall.

4. The docking station of claim 1, wherein a through groove is provided on the first main body portion, and the base portion of each cleaning member is arranged in the through groove.

5. The docking station of claim 4, wherein the first bracket comprises at least two first swinging portions, and the two first swinging portions are opposite to each other and are respectively arranged on two opposite groove walls of the through groove, wherein each cleaning member comprises two second swinging portions, and the two second swinging portions of each cleaning member are respectively arranged on two opposite sides of the base portion of each cleaning member, and wherein each of the two first swinging portions arranged opposite to each other is configured to assemble each of the two second swinging portions of the cleaning member.

6. The docking station of claim 1, wherein each first swinging portion comprises a shaft hole structure, and each second swinging portion comprises a rotating shaft structure, and wherein the rotating shaft structure of each cleaning member is inserted into the shaft hole structure of the second swinging portion.

7. The docking station of claim 1, wherein the number of the second brackets is two, and the two second brackets are arranged opposite to each other, wherein each cleaning member comprises two of the second sliding portions respectively arranged on two opposite sides of the base portion of the cleaning member, and wherein the two second sliding portions of each cleaning member are respectively assembled to two corresponding first sliding portions of the two second brackets.

8. The docking station of claim 1, wherein each first sliding portion comprises a sliding groove structure, and each second sliding portion comprises a sliding shaft structure, and wherein the sliding shaft structure of the cleaning member is inserted into the sliding groove structure of the first sliding portion, which is capable of reciprocating along a length direction of the sliding groove structure.

9. The docking station of claim 1, wherein the cleaning member assembly further comprises a guide rail fixed to the base, and the movable bracket is mounted on the guide rail, and wherein the guide rail is configured to guide the movable bracket to reciprocate in a straight line.

10. The docking station of claim 1, further comprising a cleaning assembly configured to discharge cleaning liquid to one of the cleaning member assembly and a cleaning robot docked on the base.

11. The docking station of claim 10, wherein the base comprises a waste liquid tank where both the cleaning member assembly and the cleaning assembly are accommodated.

12. The docking station of claim 11, further comprising:

a container comprising a cleaning liquid storage configured to store cleaning liquid, wherein the cleaning liquid storage is communicated with a cleaning liquid pump and the waste liquid tank; and the cleaning liquid pump configured to provide the cleaning liquid stored in the cleaning liquid storage for the cleaning assembly.

13. The docking station of claim 12, further comprising a waste liquid pump, wherein the container further comprises a waste liquid storage communicated with the waste liquid pump and the waste liquid tank, and wherein the waste liquid pump is configured to pump the waste liquid in the waste liquid tank into the waste liquid storage.

14. The docking station of claim 13, wherein a bottom of the cleaning liquid storage is communicated with a bottom of the waste liquid storage, and wherein a top of the waste liquid storage is communicated with the waste liquid tank, and a filter is provided between the top and the bottom of the waste liquid storage.

15. The docking station of claim 1, further comprising:

a power source connected to the movable bracket and configured to drive the movable bracket to reciprocate.

16. A cleaning robot system, comprising:

a docking station comprising:

a base; and a cleaning member assembly comprising:

a first bracket;

a second bracket, wherein one of the first bracket and the second bracket is a fixed bracket relative to the base, and the other is a movable bracket relative to the base, wherein the fixed bracket is fixed to the base; and at least one cleaning member, wherein each cleaning member is mounted on the first bracket and the second bracket, wherein the movable bracket is driven to reciprocate along a straight line, in order to drive each cleaning member to swing relative to the first bracket around a central axis; and a cleaning robot configured to be docked at the docking station, and wherein a cleaning member assembly is configured to scrape the cleaning robot;

wherein the first bracket comprises:

a first main body portion; and at least one first swinging portion arranged on the first main body portion;

wherein the second bracket comprises:

a second main body portion; and at least one first sliding portion arranged on the second main body portion;

wherein each cleaning member comprises:

a base portion;

a second swinging portion connected to one of the at least one first swinging portion; and a second sliding portion connected to one of the at least one first sliding portion, and wherein the second swinging portion and the second sliding portion are respectively arranged at two ends of the base portion, when the movable bracket is driven to reciprocate along a straight line, the second swinging portion of each cleaning member swings relative to the first swinging portion around the central axis, and each second sliding portion slides relative to the first sliding portion.

17. The cleaning robot system of claim 16, wherein the first bracket comprises at least two first swinging portions, and the two first swinging portions are opposite to each other and are respectively arranged on two opposite groove walls of a through groove, wherein each cleaning member comprises two second swinging portions, and the two second swinging portions of each cleaning member are respectively arranged on two opposite sides of the base portion of each cleaning member, and wherein each of the two first swinging portions arranged opposite to each other is configured to assemble each of the two second swinging portions of the cleaning member.

18. The cleaning robot system of claim 16, wherein each the first swinging portion comprises a shaft hole structure, and each second swinging portion comprises a rotating shaft structure, and wherein the rotating shaft structure of each cleaning member is inserted into the shaft hole structure of the second swinging portion.

* * * * *